(12) United States Patent
Ramaley et al.

(10) Patent No.: US 7,100,106 B1
(45) Date of Patent: Aug. 29, 2006

(54) MIRRORING OPERATIONS PERFORMED ON LINKED FILES AND FOLDERS

(75) Inventors: Alan Ramaley, Seattle, WA (US); Sankar Ramasubramanian, Redmond, WA (US); Michael Schmidt, Issaquah, WA (US); Piero Sierra, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 710 days.

(21) Appl. No.: 09/211,337

(22) Filed: Dec. 14, 1998

(51) Int. Cl.
*G06F 15/00* (2006.01)

(52) U.S. Cl. .................. 715/513; 715/511; 707/203; 707/204

(58) Field of Classification Search ............ 707/513, 707/203, 204, 511; 717/11; 345/760; 715/513, 715/511
See application file for complete search history.

(56) References Cited

U.S. PATENT DOCUMENTS

| | | | | | |
|---|---|---|---|---|---|
| 5,710,883 | A * | 1/1998 | Hong et al. | ................ | 709/246 |
| 5,815,663 | A * | 9/1998 | Uomini | ................ | 709/219 |
| 5,842,020 | A * | 11/1998 | Faustini | ................ | 395/701 |
| 5,845,293 | A * | 12/1998 | Veghte et al. | ................ | 707/202 |
| 5,905,492 | A * | 5/1999 | Straub et al. | ................ | 345/333 |
| 5,966,540 | A * | 10/1999 | Lister et al. | ................ | 717/11 |
| 5,995,756 | A * | 11/1999 | Herrmann | ................ | 395/712 |
| 6,044,387 | A * | 3/2000 | Angiulo et al. | ................ | 707/533 |
| 6,073,141 | A * | 6/2000 | Salazar | ................ | 707/204 |
| 6,081,806 | A * | 6/2000 | Chang et al. | ................ | 707/8 |
| 6,163,779 | A * | 12/2000 | Mantha et al. | ................ | 707/100 |
| 6,211,871 | B1 * | 4/2001 | Himmel et al. | ................ | 345/335 |
| 6,226,648 | B1 * | 5/2001 | Appleman et al. | ................ | 707/102 |
| 6,237,011 | B1 * | 5/2001 | Ferguson et al. | ................ | 707/515 |
| 6,237,030 | B1 * | 5/2001 | Adams et al. | ................ | 709/218 |
| 6,256,639 | B1 * | 7/2001 | Himmel et al. | ................ | 707/104 |
| 6,314,439 | B1 * | 11/2001 | Bates et al. | ................ | 707/513 |

FOREIGN PATENT DOCUMENTS

EP 1016987 A2 * 12/1999
WO 98/22881 * 5/1998

OTHER PUBLICATIONS

Yakal, K., "Work-Free Web Pages," Computer Shopper, vol. 16, No. 16, pp. 682 (reprinted), Dec. 1997.*
Kerry A. Lehto et al., Introducing Microsoft FrontPage97 (Microsoft Press: 1997), pp. 226-229.*
Kim Wimpsett (Ed.), "1998 CNET Builder.com Product Awards", Builder.com Dec. 8, 1998, from http://builder.cnet.com/webbuilding/pages/Business/1998Awards/index.html and http://builder.cnet.com/webbuilding/pages/Business/1998Awards/ss01.html Apr. 18, 2003.*

(Continued)

*Primary Examiner*—Doug Hutton
*Assistant Examiner*—R. Singh
(74) *Attorney, Agent, or Firm*—Banner & Witcoff, Ltd.

(57) ABSTRACT

A system and method of mirroring operations performed on linked files and folders is disclosed. A file and a folder are stored on a computer-readable medium. The file contains at least one reference to at least one image, stylesheet or object stored in the folder. Whenever a file operation is performed on the file, a substantially similar folder operation is performed on the folder and on each image, stylesheet and object contained in the folder. Similarly, whenever a folder operation is performed on the folder and its contents, a substantially similar file operation is performed on the file. By mirroring operations performed on linked files and folders, the system and method of the present invention helps users to manage the linked files and folders as a single entity.

28 Claims, 5 Drawing Sheets

OTHER PUBLICATIONS

Mike Dunham, "DreamWeaver: Software for Creating Web Pages", University of Minnesota Information Technology Newsletter, Oct. 1998, vol. 3 No. 7, downloaded on Apr. 18, 2003 from http://www1.umn.edu/oit/newsletter/1098-itn/dream.html.*

Christopher Minnick, "The Web of the Future", Software Development Magazine, Sep. 1997, downloaded on May 7, 2003 from http://www.sdmagazine.com/documents/s=785/sdm9709o/9709o.htm?temp=gcE17JCQm.*

Macromedia, "Macromedia Announces DreamWeaver 2", Nov. 9, 1998 Press Release, downloaded on Apr. 18, 2003 from http://www.macromedia.com/macromedia/proom/pr/1998/dw2ships.html.*

* cited by examiner

MIRRORING OPERATIONS PERFORMED ON LINKED FILES AND FOLDERS

FIELD OF THE INVENTION

The present invention relates to the field of computer files and folders. In particular, the present invention pertains to methods and systems for helping computer users manage linked files and folders by mirroring operations performed on one or the other.

BACKGROUND OF THE INVENTION

In recent years, there has been a tremendous proliferation of computers connected to a global network known as the Internet. A "client" computer connected to the Internet can download digital information from "server" computers connected to the Internet. Client application and operating system software executing on client computers typically accept commands from a user and obtain data and services by sending requests to server applications running on server computers connected to the Internet. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and the "Gopher" document protocol.

The HTTP protocol is used to access data on the World Wide Web, often referred to as "the Web." The World Wide Web is an information service on the Internet providing documents and links between documents. The World Wide Web is made up of numerous Web sites around the world that maintain and distribute Web documents. A Web site may use one or more Web server computers that are able to store and distribute documents in one of a number of formats including HTML (Hyper Text Markup Language) and MIME HTML (Multipurpose Internet Mail Extension formatting of HTML objects). HTML and MIME HTML documents can contain text as well as images, stylesheets and other objects, such as graphics, audio clips, and video clips.

A Web browser is a client application, software component, or operating system utility that communicates with server computers via FTP, HTTP, and Gopher protocols. Web browsers receive Web documents from the network and present them to a user. Internet Explorer, available from Microsoft Corporation, of Redmond, Wash., is an example of a popular Web browser.

An intranet is a local area network containing Web servers and client computers operating in a manner similar to the World Wide Web described above. Additionally, on an intranet a Web browser can retrieve files from a file system server executing on the same computer as the Web browser, or on a remote computer on the local area network. A Web browser can retrieve files on the local area network using the "FILE" protocol, which comprises file system commands.

Recently, it has become common for computer users exploring the Internet to save HTML Web pages to their local hard drives or other local storage media. This is primarily due to: (1) the delays associated with accessing Web pages on the internet; and (2) the fact that many Internet Service Providers (ISPs) charge users a fee for time spent online. This fee is in addition to the telephone charges normally incurred by a user. Thus, it is sometimes more economical for a user to save a Web page to the user's local storage medium for later viewing; thereby, minimizing the user's online fees and telephone bill.

However, managing Web pages saved onto a local hard drive can be problematic, even for experienced users. This is because each component of an HTML file must be stored in a separate file, and because Web pages are often composed of a main HTML file as well as several supporting files such as: images, stylesheets, objects and/or other HTML files. Consider the Web page illustrated in FIG. 2. This Web page is composed of a main HTML file and three supporting files. These supporting files are bitmap images: triangle 200, square 202 and circle 204. The inherent nature of HTML places a burden on users to manage all parts of an HTML file, including the main HTML file and its supporting files 200, 202 and 204. For example, a user might delete the main HTML file 302, but then forget to delete its corresponding support files 200, 202 and 204. Similarly, if a user performs an operation (e.g. delete, cut, copy, move, undo, restore, etc.) on the main HTML file 302, but forgets to perform the same operation on the supporting files 200, 202 and 204, the HTML file will be unreadable.

In the past, four different methods have been used in an attempt to make Web pages easier to manage. The first approach is used by Xanthus in its IWrite product. IWrite creates a separate folder for each saved Web page. Each supporting file is then stored in this separate folder. Users can then manage this single folder in the operating system in lieu of managing each separate file. Using the example Web page shown in FIG. 2, the main HTML file ("foo.htm") and its supporting files 200, 202 and 204 would all be stored in the same folder or subdirectory. The limitations of this approach are: (a) typical users have trouble making the required intuitive leap from "Everything is in one folder" to "I need to manage this entire folder to manage the Web page;" (b) if the typical user is looking for a Web page, the user often does not think to open the folder that contains the Web page; and (c) users who do not understand the approach spend a lot of time opening and closing folders searching for their needed files and information.

Another approach is used by Microsoft Corporation in its FrontPage® Editor software. In FrontPage® Editor, names are assigned to supporting files in order to make their relationship to the main file clearer. Using the example Web page shown in FIG. 2, FrontPage® Editor would save the main HTML file as "foo.htm." FrontPage® Editor would then change the filenames of the supporting files 200, 202 and 204, so that their relationship to the main HTML file would be clearer. For example, the filenames of the supporting files might be respectively changed from "triangle.bmp, square.bmp and circle.bmp," to "foo_triangle.bmp, foo_square.bmp and foo_circle.bmp." The limitations of this approach are: (a) in practice, users do not realize that all of these files are interrelated, so they still fail at basic file management practice; (b) there is a tremendous amount of clutter from all of the supporting files, so users have problems finding the main HTML file; (c) this approach is not supported on older operating systems that do not support longer filenames; and (d) this approach is burdensome because management of a given Web page requires that a user individually manage each file.

Still another approach is used by Trelligram. Using Trelligram's approach, all files that make up a Web page (i.e. the main HTML file and all supporting files) are saved in a single, self-extracting file. Thus, the users only need to manage one file. The limitations of this approach are that: (a) every Web page has added overhead for the extracting program, increasing the disk space used and the Web page's download time; (b) Web pages always need to be extracted before they can be viewed, because the Web pages are not stored in HTML format, this increases the delay associated with viewing the Web pages; and (c) some companies do not allow executables to be run from the Web, thus, this solution does not work for them.

Another approach is to store all the files that make up the Web page as MIME HTML, an Internet standard for bundling all the files that make up a Web page into a single file. Users then just need to handle a single file that contains their entire Web page. The limitations with this approach are that: (a) MIME HTML is only readable by some Web browsers; (b) MIME HTML takes longer to save and load than standard HTML; and (c) MIME HTML is not readable by existing HTML editors.

Accordingly, it is an object of the present invention to provide an improved method and system that allows computer users to manage linked HTML files and folders.

It is another object of the present invention to provide a file and folder structure for storing primary files (such as main HTML files and Web pages) as well as their corresponding support files.

SUMMARY OF THE INVENTION

The mirroring system of the present invention includes a computer-readable medium with computer-readable components. One component is a file component that contains at least one reference to at least one image, stylesheet or object. Another component is a folder component that contains each image, stylesheet or object referenced in (i.e. linked to) the file. The file component and the folder component are both preferably stored on the computer-readable medium in the same directory or subdirectory.

Under the mirroring method of the present invention, a file and a folder are stored on a computer-readable medium. The file contains at least one reference to at least one image, stylesheet or object stored in the folder. Whenever a file operation is performed on the file, a substantially similar folder operation is performed on the folder and on each image, stylesheet and object contained in the folder. Similarly, whenever a folder operation is performed on the folder and its contents, a substantially similar file operation is performed on the file. Preferably, the file and folder operations are identical; however, this is not necessary. By mirroring operations performed on linked files and folders, the system and method of the present invention helps users to manage the linked files and folders as a single entity.

BRIEF DESCRIPTION OF THE DRAWINGS

The present invention may take physical form in certain parts and steps, preferred embodiments of which will be described in detail in this specification and illustrated in the accompanying drawings which form a part hereof, wherein.

DETAILED DESCRIPTION OF THE INVENTION

Figure 1:
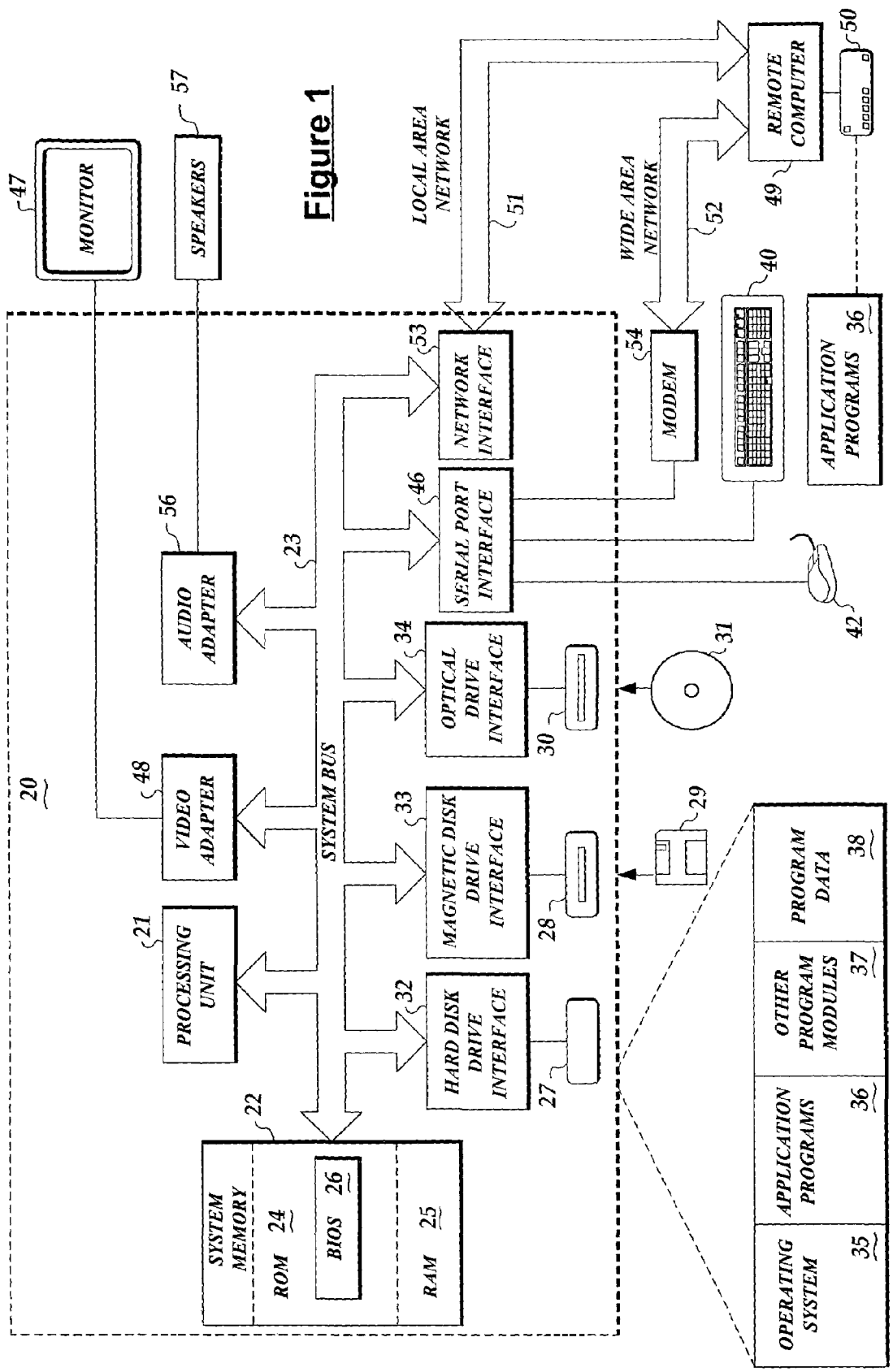
FIG. 1 is a block diagram of a general purpose computer system for implementing the present invention.

The present invention helps users to manage linked files and folders as a single entity by: (1) providing a file and folder system for storing linked entities; and (2) mirroring file or folder operations performed on one or the other. In accordance with the present invention, an operating system, a Web browser or other software program execute on a computer, such as a general purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as remote computer 49. Each remote computer 49 may be another personal computer, a server, a router, a network PC, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet. As depicted in FIG. 1, the remote computer 49 communicates with the personal computer 20 via the local area network 51. Another remote computer 49 could also communicate with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
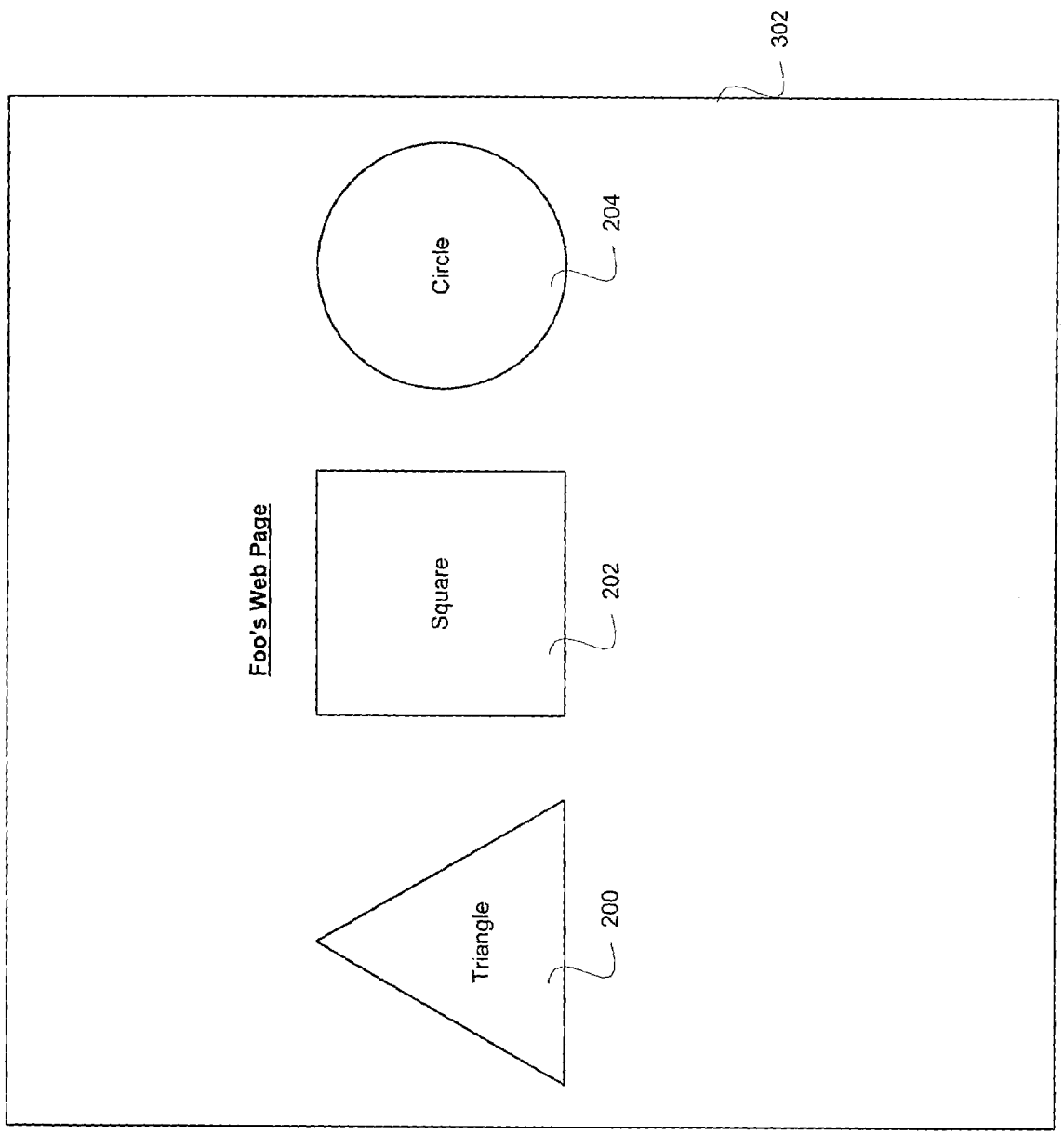
FIG. 2 is an illustration of a Web page that uses multiple support files.

As previously mentioned, FIG. 2 is an illustration of a Web page that uses multiple support files. The Web page is entitled "Foo's Web Page." The support files used and displayed in the Web page are three bitmap images: triangle 200, square 202 and circle 204. When a Web browser loads this Web page, the Web browser must separately load the triangle 200, square 202 and circle 204 bitmap images. Otherwise, the Web page will be unreadable. Accordingly, it is important for the support files to be accessible, manageable and stored in a logical manner.

Figure 3:
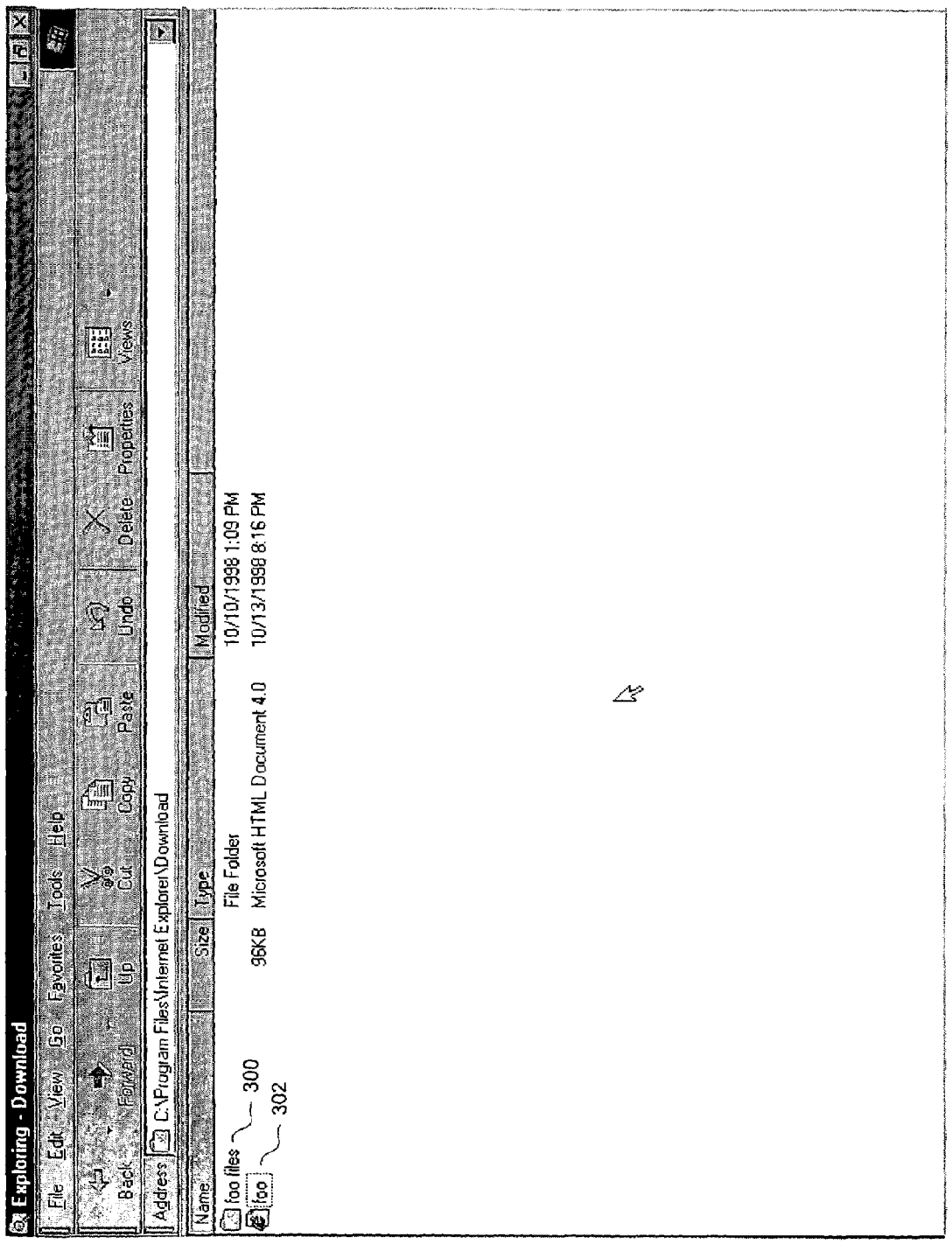
FIGS. 3 and 4 illustrate the preferred file and folder system of the present invention.
Figure 4:
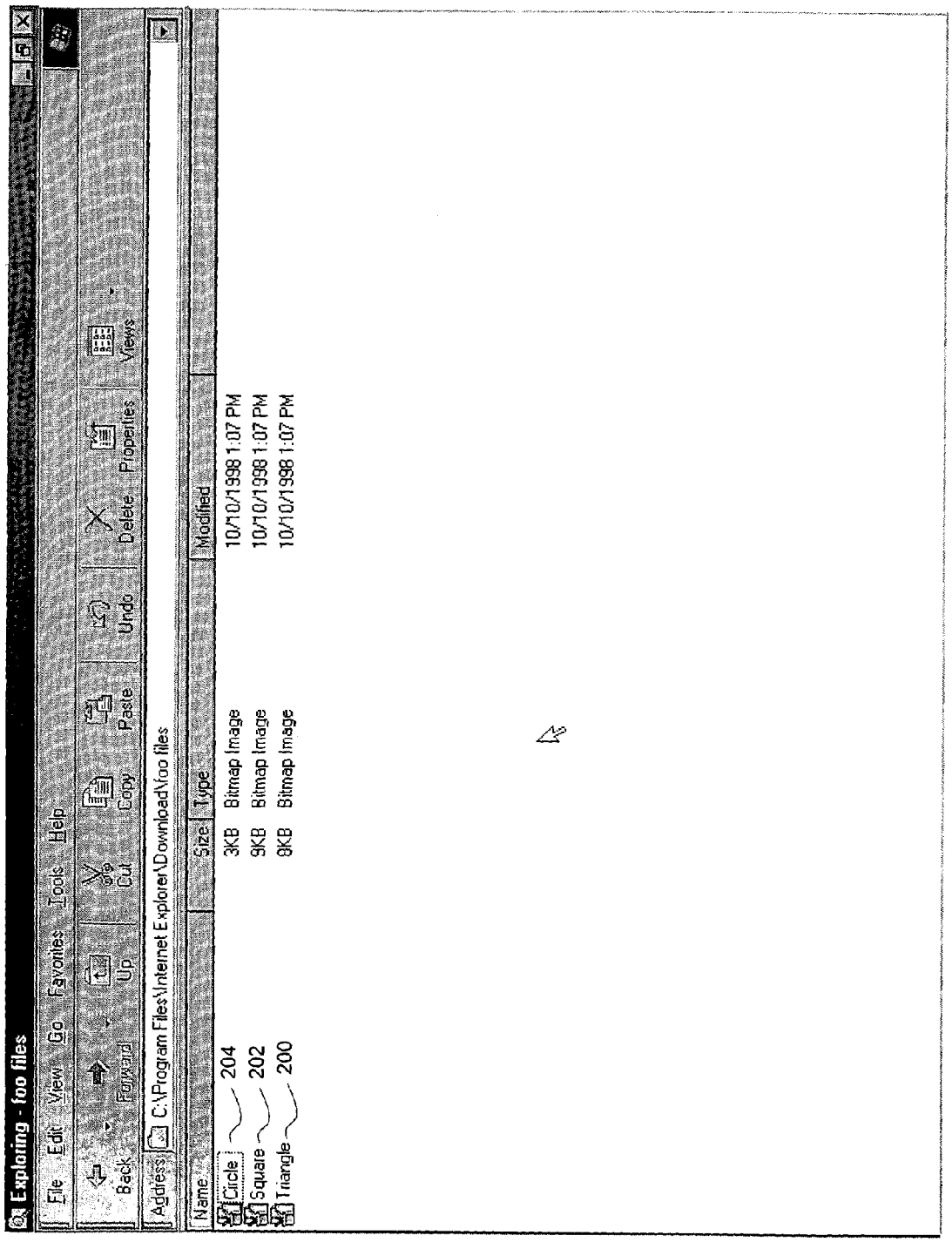

FIGS. 3 and 4 illustrate the file and folder system of the present invention. A primary file (such as a main HTML file, a Web page, etc.) 302 and a folder 300 are stored on a computer-readable medium. The primary file 302 and the folder 300 are preferably stored in the same directory, subdirectory or folder on the computer-readable medium; however, this is not required. The file 302 and the folder 300 could be stored in any location either local on or remote from the computer-readable medium. Each image, stylesheet, object or other file referenced in (i.e. linked to) the primary file 302 is stored in the folder 300. For example, the Web page shown in FIG. 2 is composed of a main HTML file 302 entitled "foo.htm" and three support files: triangle.bmp 200, square.bmp 202 and circle.bmp 204. The support files 200, 202 and 204 for the "foo.htm" file 302 are stored in a folder 300 entitled "foo files." Thus, the folder 300 contains all support files for the primary file 302.

Preferably, the primary file 302 and the folder 300 are named in such a manner to suggest to a user that the folder 300 contains all support files 200, 202 and 204 that are linked to the primary file 302. However, any file and folder naming convention could be used. In the preferred embodiment, the folder is named after the title of the Web page, an underscore character ("_") or blank space, and the suffix "files" (i.e. "<Title of Web page>_files"). For example, the name of the Web page shown in FIG. 2 is "foo." Thus, the folder 300 containing foo's support files 200, 202 and 204 is intuitively named "foo_files."

Figure 5:
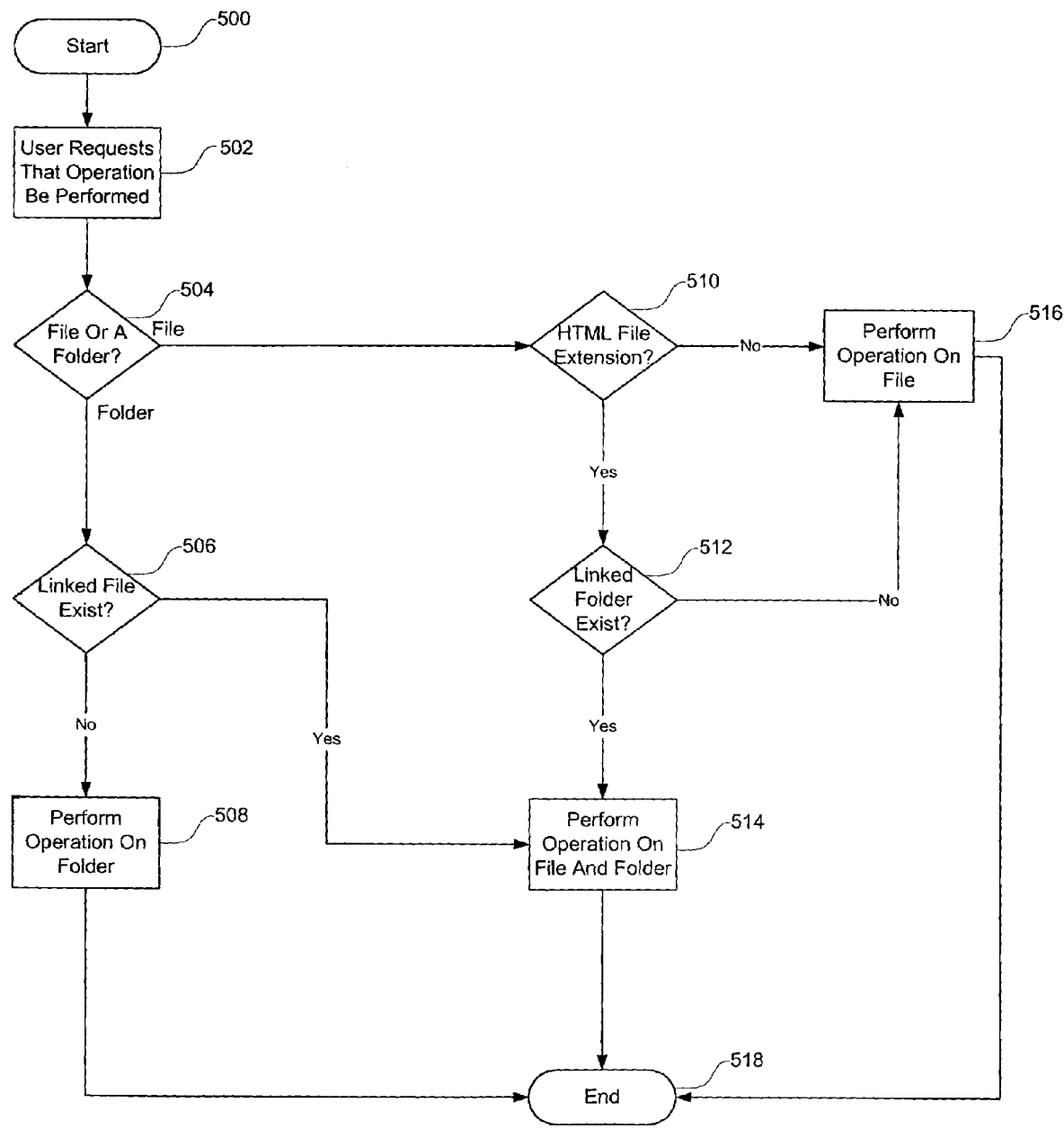
FIG. 5 is a flow diagram illustrating an exemplary process of mirroring operations performed on linked files and folders.

FIG. 5 shows a flow diagram illustrating an exemplary process of mirroring operations performed on linked files 302 and folders 300 containing supporting files 200, 202 and 204. The general concept of mirroring operations performed on linked files and folders ensures that any file operation (e.g. delete, cut, copy, move, undo, restore, etc.) performed on the primary file 302 is also performed on the supporting files 200, 202 and 204 and the folder 300 containing the supporting files. Similarly, any folder operation (e.g. delete, cut, copy, move, undo, restore, etc.) performed on the folder 300 is also performed on the primary file 302. Corresponding file and folder operations (e.g. deleting a file and deleting a folder, cutting a file and cutting a folder, copying a file and copying a folder, moving a file and moving a folder, undoing a file operation and undoing a folder operation, restoring a file operation and restoring a folder operation, etc.) may be performed in slightly different ways depending on whether the operation is being performed on a file or on a folder; however, the corresponding operations are considered to be the same or identical for the purposes of the present invention. Thus, the Web page 302, its supporting files 200, 202 and 204, and the folder 300 containing the supporting files, act like a single entity for file management purposes.

As shown in FIG. 5, the process is started at step 500 when a user requests that an operation be performed at step 502 either on a file or on a folder. As previously noted, this operation at step 502 could be delete, cut, copy, move, undo, restore, or any other file or folder operation. The process next determines whether the requested operation is to be performed on a file or on a folder at step 504. If the requested operation is to be performed on a folder, the invention identifies whether a linked file exists at step 506. In other words, the invention determines whether a primary file is associated with the selected folder. This step 506 can be accomplished in any number of ways. In the preferred embodiment, the invention utilizes the previously described file/folder naming convention (i.e. primary files are named <Title of Web page>.htm, and folders containing support files are named "<Title of Web page>_files"). The process proceeds to examines the name of the folder and determine whether the name of the folder ends with "_files" (i.e. an underscore character or blank space, and the suffix "files"). If the folder does end with the "files" suffix, the invention searches to see if a primary file named "<Title of Web page>.htm" exists. If a primary file does not exist, then there is no linked file. Accordingly, the process performs the requested operation on the folder at step 508 and then ends at step 518. If a primary file does exist, the invention performs the requested operation on both the file and the folder at step 514, and the process ends at step 518.

After step 504, the process proceeds to step 510 if the requested operation is to be performed on a file. The invention then determines whether the file is a primary file at step 510. Preferably, this is accomplished by examining the file extension for the file at step 510. If the extension for the file is either HTML or HTM 510 (i.e. the filename ends in either "*.HTML or *.HTM"), then the process searches to see whether a linked folder (containing support files for the primary file) exists at step 512. In other words, the invention determines whether a folder containing support files for the primary file exists. This step 512 can also be accomplished in any number of ways. As previously mentioned, the present invention preferably utilizes the above-identified file/folder naming convention. Thus, the process searches to see if a folder named "<Title of Web page>_files" exists. If the folder exists, then the folder is considered to be linked to the primary file, and the process performs the requested operation on both the file and the folder 514, after which the process ends at step 518. If the filename does not have an HTML or HTM extension at step 510, or if a linked folder for the primary file does not exist, the process performs the requested operation on the file at step 516, and the process ends at step 518.

As a practical example of the process of FIG. 5, consider the Web page shown in FIG. 2 and the file/folder structure depicted in FIGS. 3 and 4. If a user requests that an operation be performed on a primary file at step 502, "foo.htm," the invention recognizes that an operation on a file has been selected at step 504 and examines the file extension for the primary file at step 510. The process then determines whether a linked folder exists at step 512, by searching for a "foo_files" folder. Recognizing that the folder 300 exists, the process performs the operation on both the primary file 302, "foo.htm," and on the folder containing the support files 300, "foo_files." Thus, whatever operation that was to be performed on the file 302 (such as delete, cut, copy, move, undo or restore), the same operation is also performed on the folder 300 and on the supporting files 200, 202 and 204 contained in the folder 300.

Similarly, if a user requests that an operation be performed on the "foo_files" folder at step 502, the invention recognizes that an operation on a folder has been selected at step 504. The process then determines whether a linked file exists at step 506 for the folder. Recognizing that a "foo.htm" file exists, the process performs the operation on both the primary file, "foo.htm," and on the folder containing the support files, "foo_files." Again, whatever operation that was to be performed on the folder 300 (such as delete, cut, copy, move, undo or restore), the same operation is also performed on the file 302.

Thus, the present invention helps users manage linked files and folders as a single entity by providing a file and folder system for storing linked entities, and by mirroring file or folder operations performed on one or the other. In particular, the present invention provides a number of distinct advantages. File management is handled automatically; accordingly, there is no need for users to know that Web pages are made up of multiple files. Web pages are not hidden by folders; therefore, the pages are easy for novice users to find. There is very little clutter in the file system. The present invention works on servers that do not support long filenames. Users are not required to identify files that make up a given Web page. Users do not need to individually manage each primary and supporting file. There is no extra file size overhead in the Web page. The Web page is in HTML format, so all browsers and all Web page editors can read the file. There are no security issues with running executables over the Web. There are no additional delays associated with loading and saving Web pages. Lastly, file operations on Web pages work as users intuitively expect the operations to function.

The present invention has been described in the foregoing specification with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. A computer-readable medium having computer-executable instructions for performing steps comprising:

performing a file operation on a file stored on said computer-readable medium, said file containing at least one reference to at least one image, stylesheet or object, said file having a folder stored on said computer-readable medium, said folder containing said at least one image, stylesheet or object referenced in said file; and performing a folder operation on the folder containing said at least one image, stylesheet or object referenced in said file, said folder operation corresponding to said file operation, wherein said folder operation is performed only on said folder containing said at least one image, stylesheet or object referenced in said file.

2. The computer-readable medium of claim 1 wherein the file operation and the folder operation are identical.

3. The computer-readable medium of claim 2 wherein the file operation is selected from the group consisting of delete, cut, copy, move, undo and restore.

4. The computer-readable medium of claim 2 wherein the file is in HTML format.

5. The computer-readable medium of claim 2 wherein the file is stored in a first directory or subdirectory and the folder is stored in a second directory or subdirectory.

6. The computer readable medium of claim 5 wherein the first directory or subdirectory and the second directory or subdirectory are identical.

7. A computer-readable medium having computer-executable instructions for performing steps comprising:

performing a folder operation on a folder stored on said computer-readable medium, said folder containing at least one image, stylesheet or object; and performing a file operation on a file stored on said computer-readable medium, said file containing at least one reference to said at least one image, stylesheet or object, said folder operation corresponding to said file operation, wherein said folder operation is performed only on said folder containing said at least one image, stylesheet or object and said file operation is performed only on said file stored on said computer-readable medium.

8. The computer-readable medium of claim 7 wherein the file operation and the folder operation are identical.

9. The computer-readable medium of claim 8 wherein the file operation is selected from the group consisting of: delete, cut, copy, move, undo and restore.

10. The computer-readable medium of claim 8 wherein the file is in HTML format.

11. The computer-readable medium of claim 8 wherein the file is stored in a first directory or subdirectory and the folder is stored in a second directory or subdirectory.

12. The computer readable medium of claim 11 wherein the first directory or subdirectory and the second directory or subdirectory are identical.

13. A method of mirroring operations performed on at least one file and at least one folder stored on computer-readable medium, said method comprising the steps of:
first performing a folder operation on said folder stored on said computer-readable medium, said folder containing at least one image, stylesheet or object; and
second performing a file operation on said file stored on said computer-readable medium, said file containing at least one reference to said at least one image, stylesheet or object, said folder operation corresponding to said file operation,
wherein said file operation is performed only on said file stored on said computer-readable medium containing at least one reference to said at least one image, stylesheet or object.

14. A method of mirroring operations performed on at least one file and at least one folder stored on a computer-readable medium, said method comprising the steps of:
first performing a file operation on said file stored on said computer-readable medium, said file containing at least one reference to at least one image, stylesheet or object, wherein said file operation corresponds to a folder operation of said at least one folder; and
second performing said folder operation on said folder stored on said computer-readable medium, said folder containing said at least one image stylesheet or object, wherein said folder operation is performed only on said folder stored on said computer-readable medium.

15. A computer-readable medium having computer-executable instructions for performing steps comprising:
performing a file operation on a file stored on said computer-readable medium, said file containing at least one reference to at least one image, stylesheet or object, said file associated with a folder stored on said computer-readable medium, said folder containing said at least one image, stylesheet or object referenced in said file; and
performing a folder operation on the folder containing said at least one image, stylesheet or object referenced in said file, said folder operation corresponding to said file operation,
wherein said file is not stored within said folder and said folder is not stored within said file,
wherein said folder operation is performed only on said folder containing said at least one image, stylesheet or object referenced in said file.

16. The computer-readable medium of claim 15 wherein the file operation and the folder operation are identical.

17. The computer-readable medium of claim 16 wherein the file operation is selected from the group consisting of: delete, cut, copy, move, undo and restore.

18. The computer-readable medium of claim 16 wherein the file is in HTML format.

19. The computer-readable medium of claim 16 wherein the file is stored in a first directory or subdirectory and the folder is stored in a second directory or subdirectory.

20. The computer-readable medium of claim 19 wherein the first directory or subdirectory and the second directory or subdirectory are identical.

21. A computer-readable medium having computer-executable instructions for performing steps comprising:
performing a folder operation on a folder stored on said computer-readable medium, said folder containing at least one image, stylesheet or object; and
performing a file operation on a file stored on said computer-readable medium, said file containing at least one reference to said at least one image, stylesheet or object, said folder operation corresponding to said file operation,
wherein said file is not stored within said folder and said folder is not stored within said file,
wherein said folder operation is performed only on said folder containing said at least one image, stylesheet or object and said file operation is performed only on said file stored on said computer-readable medium.

22. The computer-readable medium of claim 21 wherein the file operation and the folder operation are identical.

23. The computer-readable medium of claim 22 wherein the file operation is selected from the group consisting of: delete, cut, copy, move, undo and restore.

24. The computer-readable medium of claim 22 wherein the file is in HTML format.

25. The computer-readable medium of claim 22 wherein the file is stored in a first directory or subdirectory and the folder is stored in a second directory or subdirectory.

26. The computer-readable medium of claim 25 wherein the first directory or subdirectory and the second directory or subdirectory are identical.

27. The method of claim 13, further comprising a step of receiving a user request to perform the folder operation on said folder stored on said computer-readable medium.

28. The method of claim 14, further comprising a step of receiving a user request to perform the file operation on said file stored on said computer-readable medium.

* * * * *